United States Patent
Decaluwe et al.

(10) Patent No.: US 9,038,293 B2
(45) Date of Patent: May 26, 2015

(54) RESINATED DEVICE FOR IDENTIFYING AN ANIMAL, AND CORRESPONDING METHOD FOR MANUFACTURING

(75) Inventors: Johan Decaluwe, Laval (FR); Jean-Jacques Hilpert, Vitre (FR); Emmanuel Lemaire, Mont d'Origny (FR)

(73) Assignee: ALLFLEX EUROPE, Vitre (FR)

( * ) Notice: Subject to any disclaimer, the term of this patent is extended or adjusted under 35 U.S.C. 154(b) by 107 days.

(21) Appl. No.: 13/816,674

(22) PCT Filed: Jul. 27, 2011

(86) PCT No.: PCT/EP2011/062896
§ 371 (c)(1),
(2), (4) Date: Apr. 12, 2013

(87) PCT Pub. No.: WO2012/019911
PCT Pub. Date: Feb. 16, 2012

(65) Prior Publication Data
US 2013/0195542 A1   Aug. 1, 2013

(30) Foreign Application Priority Data
Aug. 13, 2010 (FR) ..................... 10 56600

(51) Int. Cl.
*G09F 3/00* (2006.01)
*A01K 11/00* (2006.01)
*B29C 70/68* (2006.01)

(52) U.S. Cl.
CPC ........... *A01K 11/006* (2013.01); *Y10T 403/471* (2015.01); *A01K 11/004* (2013.01); *B29C 70/68* (2013.01)

(58) Field of Classification Search
CPC .. A01K 11/001; A01K 11/004; A01K 13/003
USPC ............................................................. 40/301
See application file for complete search history.

(56) References Cited

U.S. PATENT DOCUMENTS

| 6,098,324 A * | 8/2000 | Nepote ........................... 40/301 |
| 6,708,432 B2 * | 3/2004 | Haar et al. ...................... 40/301 |
| 7,235,055 B2 * | 6/2007 | Pfistershammer ............ 600/567 |
| 2002/0066418 A1 * | 6/2002 | Fearing et al. ................ 119/859 |
| 2004/0103567 A1 * | 6/2004 | Destoumieux ................... 40/301 |
| 2008/0222930 A1 * | 9/2008 | Pennington et al. ............ 40/301 |
| 2010/0325926 A1 * | 12/2010 | Hilpert et al. ................... 40/301 |
| 2013/0195542 A1 * | 8/2013 | Decaluwe et al. ............ 403/266 |
| 2013/0211416 A1 * | 8/2013 | Teychene et al. ............ 606/117 |
| 2014/0083367 A1 * | 3/2014 | Kellerby et al. .............. 119/651 |

FOREIGN PATENT DOCUMENTS

WO        2006045162 A2     5/2006

OTHER PUBLICATIONS

International Search Report and Written Opinion for International Application PCTEP2011/062896, Report completed Sep. 16, 2001, 7 pgs.

* cited by examiner

*Primary Examiner* — Shin Kim
(74) *Attorney, Agent, or Firm* — KPPB LLP

(57) ABSTRACT

The invention relates to a device for identifying an animal, comprising a male part and a female part which are intended to be joined together, said female part comprising a head (12) for holding a tip of said male part, and a rigid shell (11) containing electronic identification means (42). According to the invention, a resin (41) is placed inside a housing defined in said shell so as to cover said electronic means (42) and to secure said head (12) to said shell (11).

16 Claims, 5 Drawing Sheets

RESINATED DEVICE FOR IDENTIFYING AN ANIMAL, AND CORRESPONDING METHOD FOR MANUFACTURING

The field of the invention pertains to the identification and tagging of animals and, more precisely, to tagging devices, or tags. More specifically, the invention pertains to such tags provided with electronic identification means, here below called electronic tags.

Tagging for identifying animals has long been known, and is compulsory in many countries, in order to provide especially for the traceability and certification of the origin of the animals. This approach can be applied to cattle, sheep, pigs, goats, poultry and, more generally, to any animal species for which tagging is necessary or desirable.

For example, the European regulation No. 1760/2000 stipulates that cattle should be identified by means of a tag on each of their ears. These tags must carry a unique identification by which the animal can be identified and by which, for example, it is possible to know the farm in which it was born.

In the case of electronic tags, this unique identifier (or another identifier) is also memorized, so that it can be read remotely by means of a reader provided for this purpose, for example, and according to the RFID technique.

An identifying means classically consists of two parts, one male part and one female part, designed to be assembled irreversibly, for example on an animal's ear. The male part comprises, to this effect, a tip capable of passing through the animal's ear and getting housed in a corresponding receptacle of the female part, called a head or cap. This fixed joining must of course be irreversible to prevent any attempt at fraud and especially any attempt to modify the identification number on the animal.

Despite the apparent simplicity of these tags, they are relatively complex to make because of the many constraints that they must meet. First of all, as mentioned here above, it should not be possible to separate the male element from the female element, once they have been assembled with a set of pliers provided for this purpose. Nor should it be possible to dismantle the part containing the electronic identifying means.

The service life of a tag classically lasts several months or even several years, and it must of course remain operational throughout this period corresponding to an animal's life span. This means that the tagging must remain legible and non-modifiable, and that the electronic means should be not deteriorated, for example by chemical attacks due, for example to moisture or the presence of particular products. These aspects are especially important since the animal can spend at least part of its life in the open and since the tag can be subjected to different forms of aggression (moisture, friction, getting caught on branches, fences, etc.).

Besides, the animal's comfort and health need to be taken into account. The tag must therefore cause the least possible discomfort and must therefore be light and compact. Nor should it be possible, to the extent that this is feasible, for the animal to get injured if the tag gets caught for example in branches or in a fence. Finally, it is important that the cicatrization should be swift and efficient after the tag has been put in place so as to avoid risks of infection to the greatest possible extent.

The invention is aimed especially at providing a novel type of electronic tag and a corresponding novel method for manufacturing, meeting at least a part of these requirements.

To this end the invention proposes a device for identifying an animal, comprising a male part and a female part that are to be joined to each other, said female part comprising a head for receiving a tip of said male part and a rigid shell containing electronic means for identifying.

According to the invention, a resin is placed inside a recess defined in said shell, so as to cover said electronic means and fixedly join said head and said shell.

This resin fulfils a twofold function, firstly that of protecting the electronic means against chemical aggression and, secondly, that of fixed joining the shell and the cap, thus removing the need for the presence of mechanical means such as clip-on means.

Advantageously, said female part also comprises a protection element extending on at least one crown centered on the base of said head, and covering said resin.

Thus, the resin is covered by this protection element. This resin fixedly joins this protection element to the other elements of the shell.

In particular, with said shell having a lower surface that is to come at least partially into contact with the animal's skin, and an upper surface, from which said head extends, and a rim connecting said lower and upper surfaces, said protection element can cover said upper part and said rim.

The protection of the shell is thus obtained efficiently.

To ensure efficient fixed joining of the protection element on the rim, the periphery of said lower part can define a cut facet that is covered by said protection element.

Said protection element can especially be made out of polyurethane and bear a marking for identifying said animal.

According to another aspect, said head can carry at least one element extending appreciably perpendicularly to the axis of penetration of said male part into said head, that is to be buried in said resin.

This improves the quality of the fixed joining.

According to one particular aspect, the lower surface of said shell has three main concentric portions:
- an aperture enabling the passage of a tip of a male part towards said head.
- a first surface portion extending around said aperture, intended to come at least partially into contact with the animal' skin.
- a second surface extending around the first surface, and at a distance from it so as not to come into permanent contact with the animal's skin.

Thus, the surface of contact with the ear is limited, and this promotes cicatrization.

Said head is preferably made out of a rigid material, and in such a way that it breaks if there is an attempt to separate the female part and the male part. This is preferably the same for said shell.

In particular, said head and/or said shell can be made out of materials belonging to the group comprising polyamide, especially polyamide 66, and acrylonitrile styrene acrylate (ASA).

According to another particular characteristic, said head has at least one airing aperture. This promotes cicatrization.

The inlet zone of the tip of the male part, defined in said shell, can advantageously be a bore comprising a first truncated conical portion followed by a cylindrical portion.

In particular, said male part has a base and a barrel perpendicular to said base, bearing a tip, and the angle defined by said tip is preferably close to but smaller than the angle of said truncated conical portion.

The length of said male part can be defined so as to obtain a free space available for the animal's ear, of the order of 10 to 13 mm after the male part and the female part have been joined together.

The invention also pertains to a method for manufacturing a device as described here above, the manufacturing of the female part comprising the following steps:
- obtaining said shell;
- placing said head on said shell;
- placing said electronic means on said shell;
- depositing said resin so as to cover said electronic means and fixedly join said shell and said head.

Preferably, this method further comprises a step for:
- placing a surface of protection on the resin and/or the rim of said shell.

Other features and advantages shall appear from the following description of a preferred embodiment, given as a simple illustratory and non-exhaustive example, and from the appended figures, of which:

Figure 8:
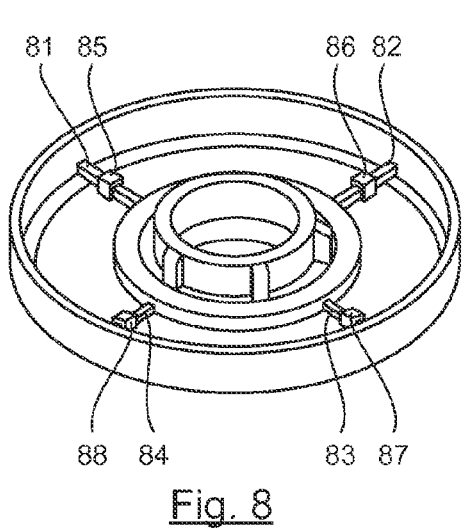
FIGS. 8 and 9 illustrate the means for receiving electronic means, these means for receiving being absent (FIG. 8) or present (FIG. 9)
Figure 9:
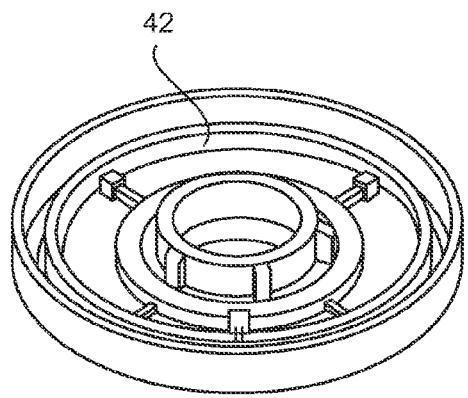
Figure 10:
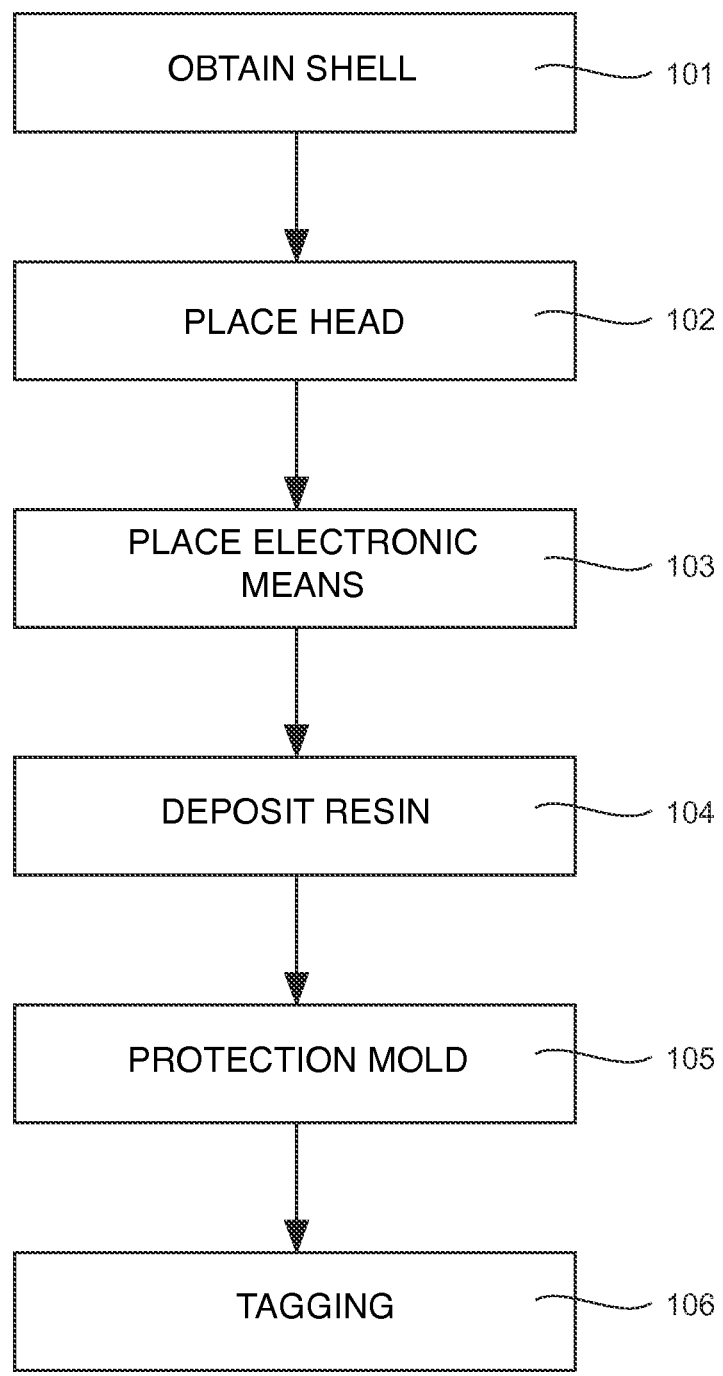

FIG. 10 provides a schematic description of a method for manufacturing the female part of a tag according to FIGS. 1 to 9.

Figure 1:
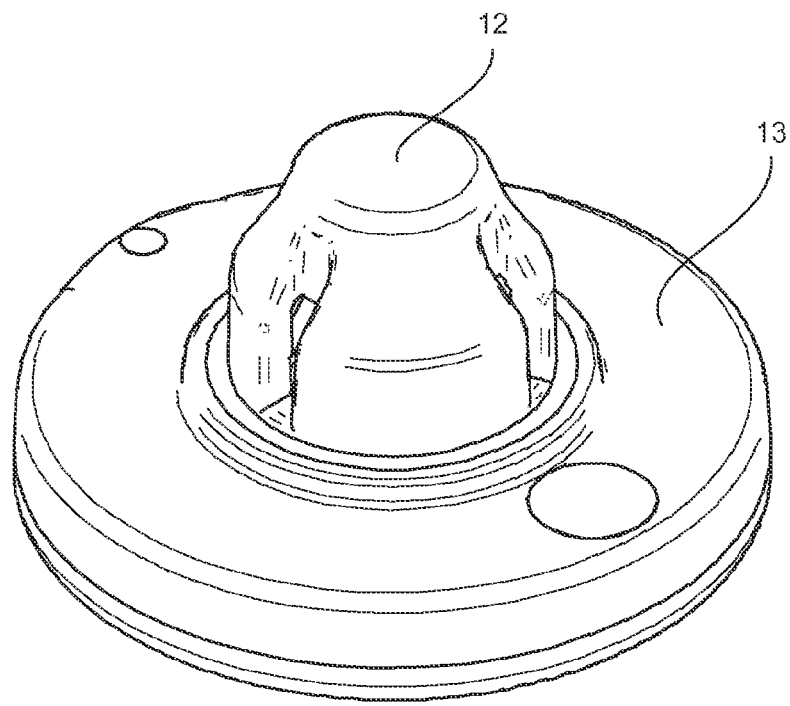
FIGS. 1 and 2 show the female part of a device according to the invention, respectively in a top view and a bottom view, in perspective (for the requirements of the invention, the term "top" of the female part is the part carrying the head, or hat)
Figure 2:
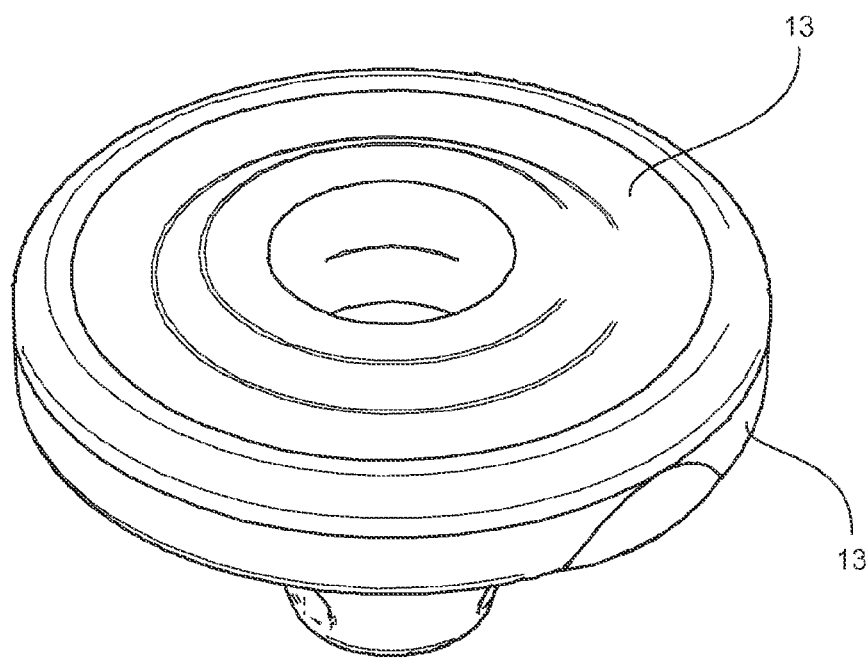
Figure 3:
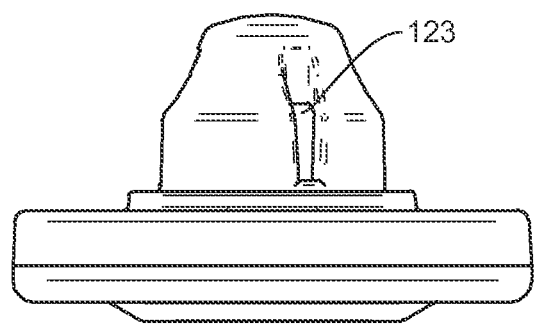
FIG. 3 is a side view of the female part of FIGS. 1 and 2.

The embodiment described here below pertains to a tag meant especially to be fitted to sheep. As can be seen in FIGS. 1 and 2, the female part is highly compact and takes up little space. Depending on the materials used, it can weigh less than 3 g, for example of the order of 2.6 g.

This female part consists of three main elements:
- a rigid shell 11;
- a head, or cap, also rigid 12;
- a tagging and protection surface 13 made out of a more flexible material and typically polyurethane (elastomer).

As shall be seen more specifically here below, the shell 11 is suited to receiving the electronic identifying means.

As already mentioned, it is of course essential that the tagging made on the surface 131 should a very well hold-out in the plane, and especially have high resistance to external aggression. In this context the material, polyurethane, appears at the present time to be almost essential for use in complying with requirements of abrasion.

By contrast, the head 12 must be made out of a rigid material that breaks or shatters in the event of any attempted fraud. In the embodiment described, this head is made out of polyamide 66.

Owing to the advantages of polyurethane, it can be imagined that the shell 11 is made out of this material and is made as a single piece with the tagging surface. However, the flexibility of this material hampers the well hold-out of the tags. As a consequence, it is necessary to provide a shell 11 made out of a rigid material. In the embodiment illustrated, this material is acrylonitrile styrene acrylate (ASA). This rigid material gives a better hold-out. By contrast, it is not compatible, in over-molding, with polyurethane. However, it is necessary as already explained that the fixed joining of the different components of the female part should be done irreversibly (barring the destruction or damaging of the tag).

Since over-molding is not possible, it is possible to envisage mechanical joining, for example through clip-on means. However, this approach assumes shapes with consequential dimensions that would not be suited to a tag, which should have the smallest possible weight, especially for the identification of sheep. If not, the lamb's ear could be damaged.

Figure 4:
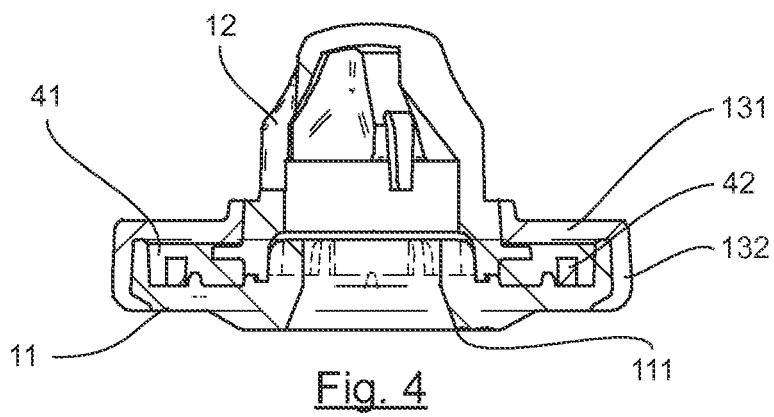
FIG. 4 is a view in section of FIG. 3.
Figure 5:
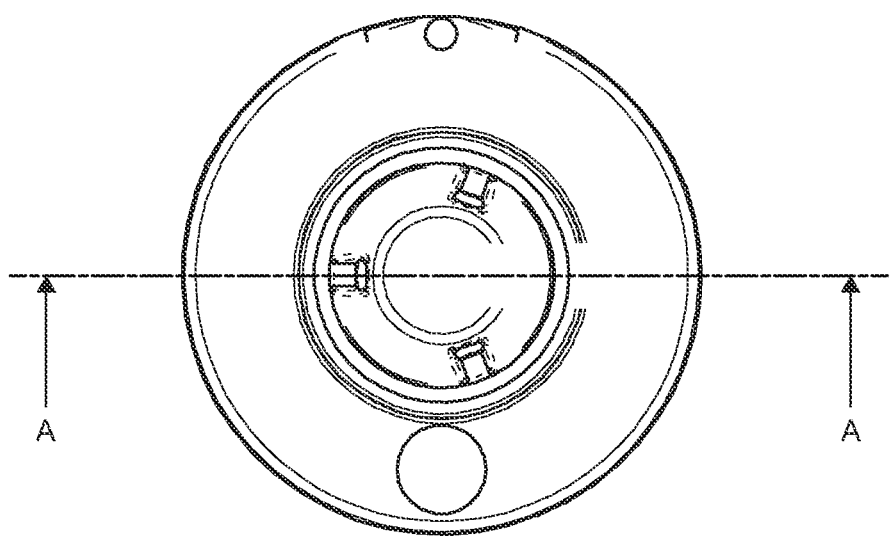
FIG. 5 shows the location of the section of FIG. 4.

According to the invention, the fixed joining of the three elements 11, 12 and 13, is therefore ensured by a resin 41 as can be seen in the view in section A-A of FIG. 4. This resin 41 provides for fixed joining by bonding.

This resin 41 furthermore covers the electronic means 42, which can especially include a strand of an electrical conductor forming an antenna and a storage element for storing the identification number. Thus, this resin 41 immobilizes the electronic means 42 inside the shell 11 and protects them against chemical aggression.

Figure 6:
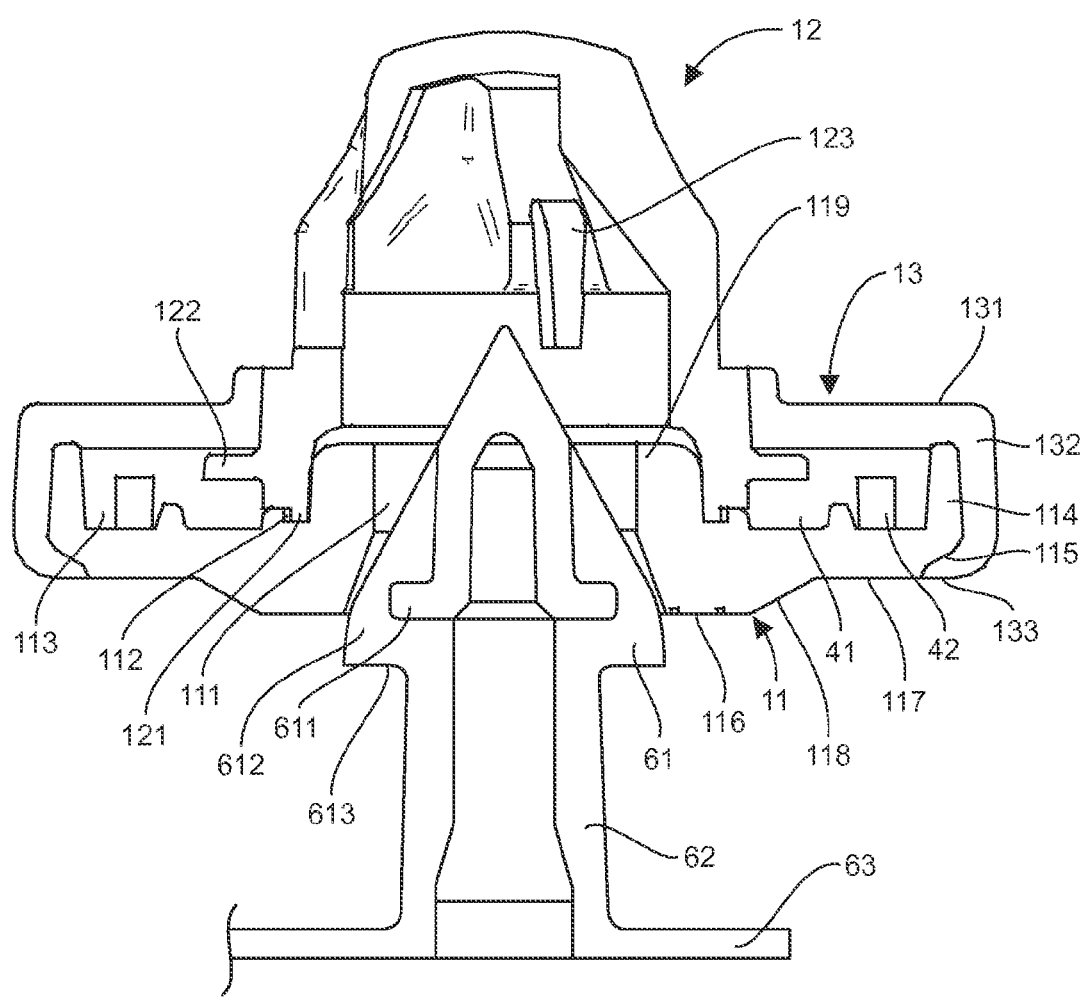
FIG. 6 shows a view in section of the male part and female part in course of assembly.
Figure 7:
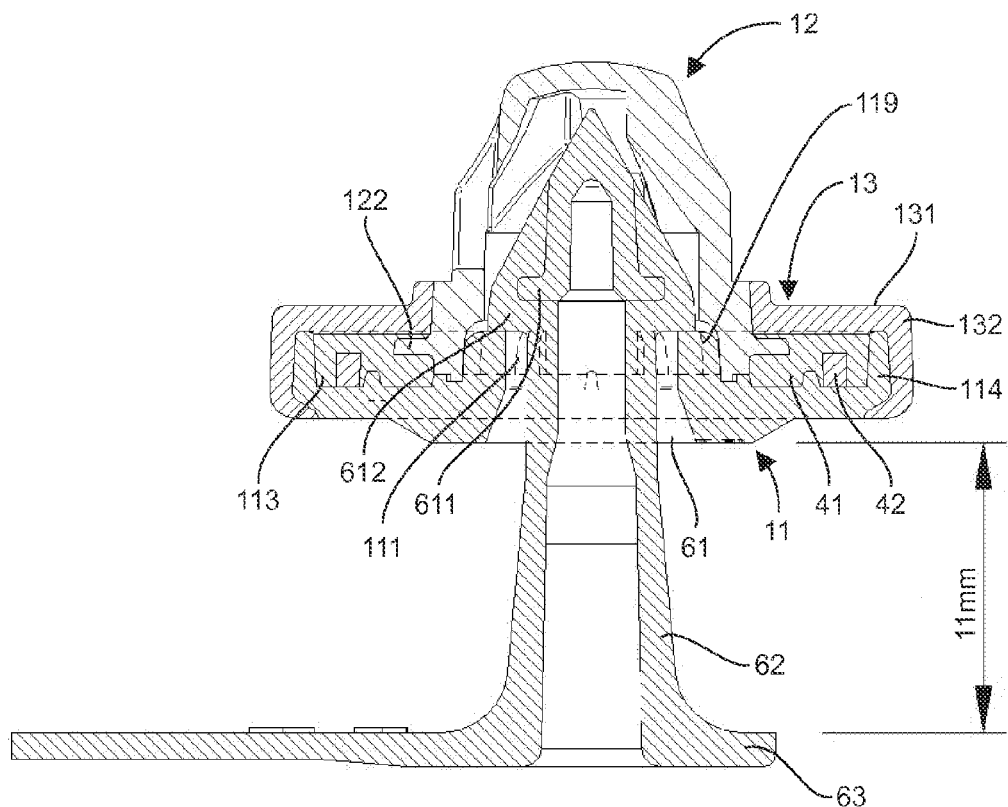
FIG. 7 shows a view in section of the male part and the female part of FIG. 6, once assembled.

As can be seen in FIG. 4, as well as in FIG. 6, the parts 11, 12 and 13 have several particular features intended to facilitate their assembling and their fixed joining. Naturally, according to other embodiments, these means may be different or even eliminated.

Thus, the shell (or pedestal) 11 comprises the central part 111, which is an aperture that is to receive the tip of the male part.

Starting from the centre of the shell (or pedestal) 11, defined by the central axis of the part (in the embodiment illustrated, the female part has a symmetry generated by revolution that is advantageous for assembling and limits the risks of the tag getting caught once it is fitted into the ear. However, naturally, other rectangular oval or any unspecified shapes can be envisaged). It has been planned to have a first groove 112 capable of receiving a lower crown 121 of the head 12. This enables the head 12 to be placed easily on the pedestal and to be kept in the appropriate position when being assembled by means of the resin 41.

The head 12 also has a flange 122 extending perpendicularly to the axis of revolution of the female part and increasing the surface of contact with the resin 41 and therefore the efficiency of the fixed joining.

The shell (or pedestal) 11 also has a zone for receiving electronic means 42, more specifically illustrated in FIGS. 8 and 9. As can be seen in these figures, the means for receiving are, in this embodiment, constituted by four elements of small width, such as ribs 81 to 84, forming supports for the electronic means 42. Thus, the resin 41 extends also beneath these electronic means so that they are integrally or almost integrally surrounded and covered by this resin, which provides for chemical protection.

These ribs carry lugs 85 to 88 holding these electronic means in the desired position.

The element 13 covers the upper part of the resin 41 to define the tagging surface 131.

It also extends by a portion 132 along the rim 114 of the shell 11 so as to protect this rim against wear and tear. To provide for efficient joining, the lower part of the rim 114 has a cut facet 115 on which the terminal part 133 of the polyurethane element gets hooked. This part 133 is positioned in the extension of the lower surface of the pedestal 11 to eliminate any roughness.

This lower part of the shell (see FIG. 2) has three main concentric zones:
- the aperture 111, described here below;
- a first surface 116 designed to come into contact with the animal's ear;
- a second surface 117 parallel to the first surface 116 but distant from the animal's ear.

The two surfaces 116 and 117 are connected by a cut facet 118. Thus, the surface in contact with the animal's ear is reduced. In this way, the zone of contact and the support on the ear are limited and cicatrization is promoted.

The aperture 111 has two successive portions:
a first truncated conical portion 1111;
a second cylindrical portion 1112.

The truncated conical portion 1111 is designed to cooperate with the tip 61 of the male part so that the contact between this tip and the aperture takes place along a circle, providing for a "punch" effect, enabling a positioning without tearing the ear.

To this end, the angle $\alpha_1$ of the aperture of the truncated conical part 1111 with the axis of revolution is slightly greater than the angle $\alpha_2$ formed by the tip 61 with the same axis.

Classically, the male part therefore comprises a tip 61 mounted on a barrel 62 extending from a base 63, parallel to the shell (or pedestal) 11, when the tag is assembled and extending on the other side of the ear so as to provide for fixed joining.

The length of the barrel 62 is chosen so as to enable efficient airing of the scar while at the same time limiting the possibilities of getting hooked into breeding equipment (threads, chains, feed bunks, animal stalls, etc) or with other animals.

This value is suited to obtaining an free space available for the animal's ear, after the joining of the male part and the female part, of the order to 10 to 13 mm, for example 11 mm, as illustrated in FIG. 9, which shows a view in section of the assembled male and female parts.

The tip 61 consists of a first metal part, plastic (for example PA6-PA66-PU), or any other sufficiently hard material or alloy (brass, zamak, etc) 611 enabling the ear to be pierced, and a second part 612 made out of plastic, for example polyurethane, formed as a single piece with a barrel 62 and the base 63.

The tip 61 is designed to penetrate through the aperture 111, up the interior of the head 12. A suitable set of pliers enables the application of the necessary force to provide for penetration. Once this penetration is done, it is no longer possible to separate the male part and the female part, since the base 613 of the tip comes to rest on the surfaces 119 planned for this purpose in the shell 11 on the periphery of the cylindrical part 1112 of the aperture 111. In a known way, it is possible to provide for fins that move apart when the tip passes through and then take position in contact with the base of the tip 613.

The head 13 advantageously has one or more airing slots 131 enabling air to circulate within the female receptacle.

The invention also pertains to a method for manufacturing identifying tags as described here above, and especially the female part. FIG. 10 is a schematic illustration of this method.

In a first step (101), the shell (or pedestal) 11 is obtained first of all by means of an adapted molding.

The head 12 is placed (102) on this shell (or pedestal) 11, by introducing the tag 121 into the groove 112. Electronic means 42 are also placed (103) into the groove 113. The two steps 102 and 103 can be done in the opposite order or simultaneously.

The resin 41 is then deposited and covers the electronic means 42 and therefore provides for tight sealing against chemical corrosion and fixedly joins the shell (or pedestal) 11 and the head 12.

Then, the polyurethane tagging surface 13 is added on (105) so that it extends on the upper surface of the resin 41 and on the rim 114 of the shell (or pedestal) 11.

Finally, in a last step 106, a tagging is applied to the surface 131, for example by means of a laser.

The invention claimed is:

1. A device for identifying an animal, comprising:
   a male part; and
   a female part;
   wherein the male part and the female part are configured to be joined to each other;
   wherein said female part comprises a head for receiving a tip of said male part and a rigid shell containing electronic means for identifying; and
   wherein a resin is placed inside a recess defined in said rigid shell so as to cover said electronic means and fixedly join said head and said shell.

2. The device of claim 1, wherein said female part further comprises a protection element extending on at least one crown centered on the base of said head and covering said resin.

3. The device of claim 2, wherein:
   said shell has a lower surface that is to come at least partially into contact with an animal's skin, an upper surface from which said head extends, and a rim connecting said lower and upper surfaces; and
   said protection element covers said upper part and said rim.

4. The device of claim 3, wherein the periphery of said lower part defines a cut facet that is covered by said protection element.

5. The device of claim 2, wherein said protection element bears a marking for identifying said animal.

6. The device of claim 1, wherein said head carries at least one element extending appreciably perpendicularly to the axis of penetration of said male part into said head and that is to be buried in said resin.

7. The device of claim 1, wherein the lower surface of said shell comprises:
   an aperture enabling the passage of a tip of a male part towards said head;
   a first surface portion extending around said aperture, intended to come at least partially into contact with the animal' skin; and
   a second surface portion extending around the first surface portion at a distance from it so as not to come into permanent contact with the animal's skin;
   wherein the aperture, the first surface portion, and the second surface portion are concentric.

8. The device of claim 1, wherein said head is made out of a rigid material configured to break if there is an attempt to separate the female part and the male part.

9. The device of claim 1, wherein said shell is made out of a rigid material.

10. The device of claim 8, wherein the rigid material is selected from the group consisting of polyamide, polyamide 66, and acrylonitrile styrene acrylate (ASA).

11. The device of claim 1, wherein said head has at least one airing aperture.

12. The device of claim 1, further comprising an inlet zone of the tip of the male part and defined in said shell;
    wherein the inlet zone is a bore comprising a first truncated conical portion followed by a cylindrical portion.

13. The device of claim 12, wherein:
    said male part comprises a base and a barrel perpendicular to said base bearing a tip; and
    the angle defined by said tip being close to but smaller than the angle of said truncated conical portion.

14. The device of claim 1, wherein the length of said male part is defined so as to obtain a free space available for an animal's ear of the order of 10 to 13 mm after the male part and the female part have been joined together.

15. A method for manufacturing the female part of a device for identifying an animal, comprising:
- obtaining a shell using a manufacturing device;
- placing a head on said shell using the manufacturing device;
- placing electronic means on said shell using the manufacturing device; and
- depositing resin so as to cover said electronic means and fixedly join said shell and said head using the manufacturing device.

16. The method of claim 15, further comprising
placing a surface of protection on the resin and/or the rim of said shell using the manufacturing device.

* * * * *